(12) United States Patent
Kuramochi

(10) Patent No.: US 10,946,285 B2
(45) Date of Patent: Mar. 16, 2021

(54) PROGRAM, TERMINAL DEVICE, GAME SYSTEM AND GAME SYSTEM CONTROL METHOD FOR CHANGING DISPLAYED GAME MEDIA BASED ON PROCESSING REQUEST

(71) Applicant: POKELABO, INC., Tokyo (JP)

(72) Inventor: Motoki Kuramochi, Tokyo (JP)

(73) Assignee: POKELABO, INC., Tokyo (JP)

( * ) Notice: Subject to any disclaimer, the term of this patent is extended or adjusted under 35 U.S.C. 154(b) by 56 days.

(21) Appl. No.: 16/405,389

(22) Filed: May 7, 2019

(65) Prior Publication Data

US 2019/0344179 A1    Nov. 14, 2019

(30) Foreign Application Priority Data

May 8, 2018    (JP) .............................. JP2018-089598

(51) Int. Cl.
| | | |
|---|---|---|
| A63F 13/00 | (2014.01) | |
| A63F 13/69 | (2014.01) | |
| A63F 13/32 | (2014.01) | |
| A63F 13/48 | (2014.01) | |
| A63F 13/352 | (2014.01) | |

(52) U.S. Cl.
CPC .............. *A63F 13/69* (2014.09); *A63F 13/32* (2014.09); *A63F 13/352* (2014.09); *A63F 13/48* (2014.09)

(58) Field of Classification Search
None
See application file for complete search history.

(56) References Cited

FOREIGN PATENT DOCUMENTS

| | | | |
|---|---|---|---|
| JP | 2015-122085 | A | 7/2015 |
| JP | 2015-150070 | A | 8/2015 |
| JP | 2016-182326 | A | 10/2016 |
| JP | 2016-209664 | A | 12/2016 |
| JP | 2017-012940 | A | 1/2017 |
| JP | 2018-29986 | A | 3/2018 |

OTHER PUBLICATIONS

"Ticket to Ride Online—Tutorial", [dated 2011]. [online], [retrieved Sep. 12, 2020]. Retrieved from the Internet <URL:https://www.youtube.com/watch?v=pPKPSV5fiDc>. 5 pages.*
"Drm-free-multiplayer-games-humble-bundle". From blog.humblebundle.com via The Way Back Machine (www.archive.org). [dated Oct. 18, 2013]. [online], [retrieved on Sep. 12, 2020]. Retrieved from the Internet <URL:https://blog.humblebundle.com/post/64128935736/drm-free-multiplatform-games-are-back-on-humble-bundle>. 1 page.*
May 28, 2019 Office Action issued in Japanese Patent Application No. 2018-089598.
Nov. 10, 2020 Office Action issued in Japanese Patent Application No. 2019-174787.

* cited by examiner

*Primary Examiner* — Lawrence S Galka
(74) *Attorney, Agent, or Firm* — Oliff PLC

(57) ABSTRACT

A program executes a step that displays one or more first game media in a first region on a screen, a receiving step that receives a request for a first processing that determines selected game media from among a plurality of game media including at least the first game media displayed in the first region, a step that displays the selected game media determined by the first processing, and a change step that changes at least a portion of the first game media out of the one or more first game media displayed in the first region to other first game media, each time the first processing is executed.

13 Claims, 10 Drawing Sheets

| USER ID | USER NAME | POSSESSED SECOND GAME MEDIA | POSSESSED GAME MEDIA | COOPERATING USER INFORMATION | GROUP POINT | ... |
|---|---|---|---|---|---|---|
| U01 | USER A | T01, T02, T03 | C01 | U02, U05 | 140 | ... |
| U02 | USER B | T04 | C02 | U01, U05 | 140 | ... |
| U03 | USER C | T05 | C03 | U04 | 20 | ... |
| ... | ... | ... | ... | ... | ... | ... |
| ... | ... | ... | ... | ... | ... | ... |

FIG. 2

| GAME MEDIA ID | CLASSIFICATION | ⋮ |
|---|---|---|
| T01 | A | ⋮ |
| T02 | B | ⋮ |
| T03 | C | ⋮ |
| T04 | D | ⋮ |
| ⋮ | ⋮ | ⋮ |

FIG. 3

| GAME MEDIA ID | GAME MEDIA NAME | RARITY | FIRST GAME MEDIA FLAG | SECOND PROBABILITY | GAME RESULT FLAG | ... |
|---|---|---|---|---|---|---|
| C01 | GAME MEDIA A | ULTRA-RARE | ○ | 10 | ○ | ... |
| C02 | GAME MEDIA B | SUPER-RARE | ○ | 10 | (NO SETTING) | ... |
| C03 | GAME MEDIA C | SUPER-RARE | ○ | 10 | (NO SETTING) | ... |
| C04 | GAME MEDIA D | RARE | ○ | 10 | (NO SETTING) | ... |
| C05 | GAME MEDIA E | SUPER-RARE | ○ | 10 | (NO SETTING) | ... |
| C06 | GAME MEDIA F | SUPER-RARE | ○ | 10 | (NO SETTING) | ... |
| C07 | GAME MEDIA G | SUPER-RARE | ○ | 10 | (NO SETTING) | ... |
| C08 | GAME MEDIA H | RARE | ○ | 10 | (NO SETTING) | ... |
| C09 | GAME MEDIA I | RARE | ○ | 10 | (NO SETTING) | ... |
| C10 | GAME MEDIA J | ULTRA-RARE | ○ | 10 | ○ | ... |
| C11 | GAME MEDIA K | RARE | (NO SETTING) | (NO SETTING) | (NO SETTING) | ... |
| C12 | GAME MEDIA L | RARE | (NO SETTING) | (NO SETTING) | (NO SETTING) | ... |
| C13 | GAME MEDIA M | NORMAL | (NO SETTING) | (NO SETTING) | (NO SETTING) | ... |
| C14 | GAME MEDIA N | NORMAL | (NO SETTING) | (NO SETTING) | (NO SETTING) | ... |

FIG. 4

| GAME PART ID | GAME PART NAME | USER INFO | FIRST REGION INFORMATION | | | | | | | | | | | SECOND REGION INFO | TOTAL OF FIRST PROBABILITIES OTHER THAN FIRST REGION |
|---|---|---|---|---|---|---|---|---|---|---|---|---|---|---|---|
| | | | FIRST GAME MEDIA 1 | | FIRST GAME MEDIA 2 | | FIRST GAME MEDIA 3 | | FIRST GAME MEDIA 4 | | FIRST GAME MEDIA 5 | | TOTAL OF FIRST PROBABILITIES OF FIRST REGION | | |
| | | | ID | FIRST PROBABILITY | ID | FIRST PROBABILITY | ID | FIRST PROBABILITY | ID | FIRST PROBABILITY | ID | FIRST PROBABILITY | | | |
| G01 | GAME PART A | U01 | C01 | 2 | C02 | 2 | C03 | 2 | C04 | 2 | C05 | 2 | 10 | C06 | ⋮ |
| G02 | GAME PART B | U02 | C01 | 2 | C04 | 2 | C03 | 2 | C06 | 2 | C05 | 2 | 10 | C02 | ⋮ |
| G03 | GAME PART C | U03 | C01 | 2 | C02 | 2 | C02 | 2 | C03 | 2 | C04 | 2 | 10 | C01 | ⋮ |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

FIG. 5

PROGRAM, TERMINAL DEVICE, GAME SYSTEM AND GAME SYSTEM CONTROL METHOD FOR CHANGING DISPLAYED GAME MEDIA BASED ON PROCESSING REQUEST

This application claims the benefit of priority from Japanese Patent Application No. 2018-089598 filed May 8, 2018, the entire contents of the prior application being incorporated herein by reference.

TECHNICAL FIELD

The present invention relates to a program, a terminal device, a game system and a game system control method.

Conventionally, a game has been known in which game media can be selected from a plurality of game media. For example, in Patent Reference 1, a lottery game is disclosed in which the probability that an item provided to the user will be drawn from among a plurality of types of items can change.

PRIOR ART TECHNOLOGY REFERENCE

Patent Reference

[Patent Reference 1] Japanese Published Patent Application 2017-12940

SUMMARY

Problem to be Resolved

Conventionally, in a game in which game media is selected from a plurality of game media, selection of the game media is executed by the game system, so the game becomes monotonous to the user and there is a possibility that the user's desire to continue the game will wane.

In consideration of the foregoing, it is an object of the present disclosure to provide a program, a terminal device, a game system and a game system control method that improve a user's desire to continue the game, in a game in which the game media are selected from a plurality of game media.

Means of Solving the Problem

The program according to an embodiment is a program that causes a terminal device to execute: a step that displays one or more first game media in a first region on a screen; a receiving step that receives a request for first processing that determines a selected game media from among a plurality of game media including at least the first game media displayed in the first region; a step that displays the selected game media determined by the first processing; and a change step that changes at least a portion of the first game media out of the one or more first game media displayed in the first region to other first game media, each time the first processing is executed.

The terminal device according to an embodiment is a terminal device provided with a controller that executes processing related to a game. The controller displays one or more first game media in a first region on a screen; receives a request for first processing that determines selected game media from among a plurality of game media including at least the first game media displayed in the first region; displays the selected game media determined by the first processing; and changes at least a portion of the first game media out of the one or more first game media displayed in the first region to other first game media, each time the first processing is executed.

The game system according to an embodiment is provided with a terminal device used by a user and a server device that provides a game to the terminal device. The terminal device displays one or more first game media in a first region on a screen, and upon receiving a first processing request to determine selected game media from among the plurality of game media including at least the first game media displayed in the first region, sends a request for the first processing to the server device. The server device, upon receiving from the terminal device the request for the first processing, executes the first processing, determines the selected game media from among the plurality of game media including at least the first game media displayed in the first region, and sends to the terminal device an instruction to cause the selected game media to be displayed. The terminal device, upon receiving the instruction to display the selected game media from the server device, displays the selected game media determined by the first processing, and changes at least a portion of the first game media out of the one or more first game media displayed in the first region to other first game media, each time the first processing is executed.

The control method according to an embodiment is a control method for a game system comprising a terminal device used by a user and a server device that provides a game to the terminal device. The control method includes: a step that displays one or more first game media in a first region on a screen on the terminal device; a receiving step that receives in the terminal device a request for a first processing that determines selected game media from among a plurality of game media including at least the first game media displayed in the first region; a step that displays on the terminal device the selected game media determined by the first processing; and a change step that changes at least a portion of the first game media out of the one or more first game media displayed in the first region to other first game media, each time the first processing is executed.

Effect

With the program, terminal device, game system and game system control method according to an embodiment, it is possible to improve a user's desire to continue the game, in a game in which game media is selected from a plurality of game media.

BRIEF DESCRIPTION OF DRAWINGS

FIG. 2 is a drawing showing information relating to users.

FIG. 3 is a drawing showing information relating to the second game media.

FIG. 4 is a drawing showing information relating to game media other than the second game media.

FIG. 5 is a drawing showing information relating to a game part.

MODES TO IMPLEMENT EMBODIMENTS

Below, embodiments are described with reference to the drawings.

(Game System Configuration)

Figure 1:
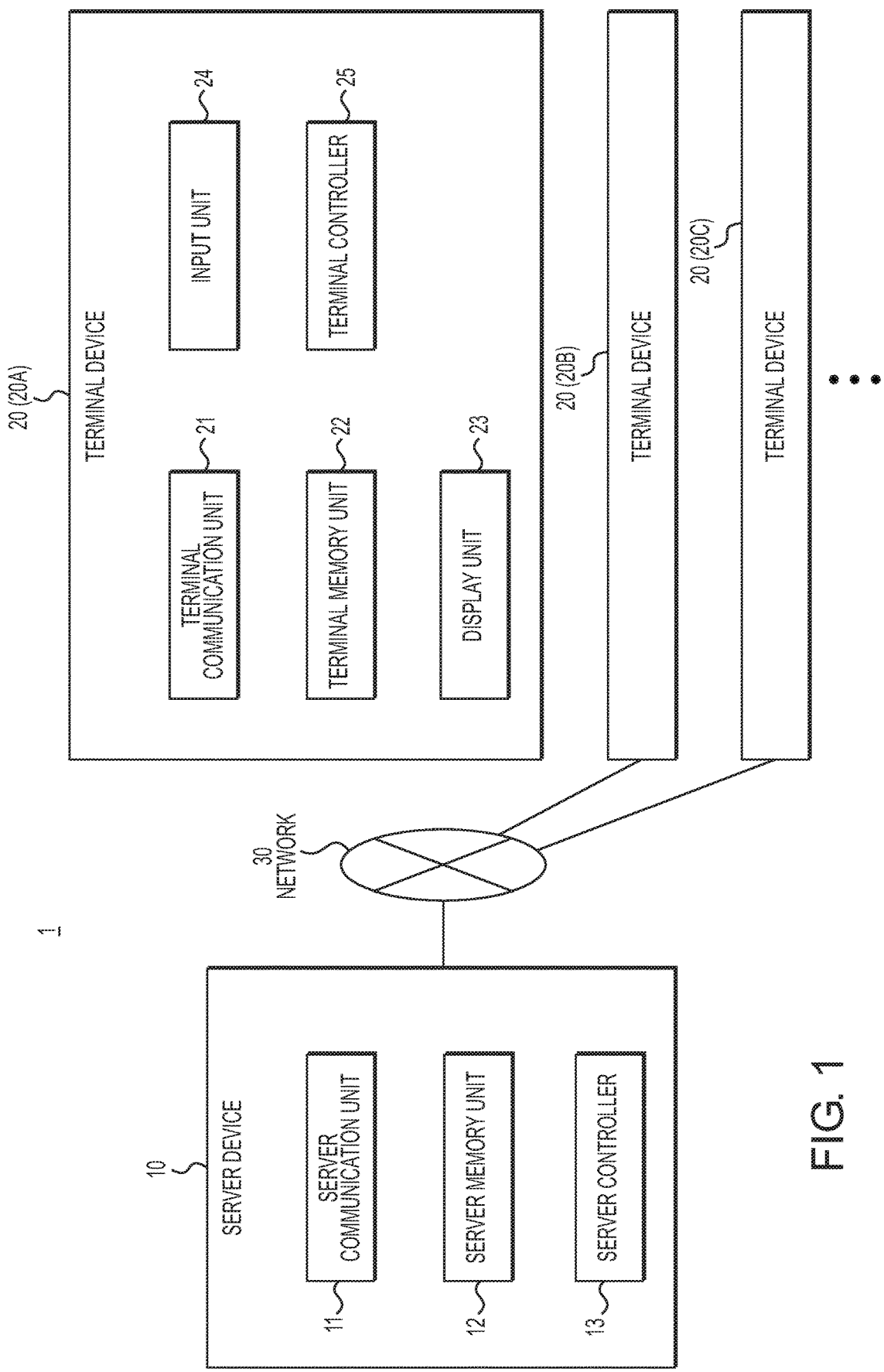
FIG. 1 is a block diagram of a game system according to an embodiment.

An overview of a game system 1 according to an embodiment will be described with reference to FIG. 1. The game system 1 is provided with a server device 10 and one or more terminal devices 20. For simplicity, three terminal devices 20A, 20B and 20C are shown in FIG. 1, but the number of terminal devices 20 may be arbitrarily set.

The server device 10 is an information processing device such as a server managed by a game administrator, for example. The terminal devices 20 are information processing devices used by users, for example mobile phones, smartphones, tablet computers, personal computers (PCs), game devices or the like. Each terminal device 20 is capable of executing an application program for a game according to this embodiment. Below, the application program is also called simply an application. The game application may be transmitted from a prescribed application distribution server to each terminal device 20 via a network 30 such as the Internet, for example. Or, the game application may be stored in advance in a memory medium such as a memory card or the like readable by the terminal device 20 or a memory device provided in each terminal device 20. The server device 10 and the terminal devices 20 are connected so as to be able to communicate via the network 30.

The server device 10 and the terminal device 20 work together to execute a plurality of processes related to the game. For example, the server 10 and the terminal devices 20 may distribute and execute a series of processes. In addition, the server device 10 and the terminal devices 20 may each respectively execute the same processes. For these same processes, when the process results match between the server device 10 and the terminal devices 20, the server device 10 and the terminal devices 20 may conclude the process. On the other hand, when the process results between the server device 10 and the terminal devices 20 do not match, the server device 10 and the terminal devices 20 may deem the process results of the server device 10 to be correct, for example, and conclude the same process, or may repeat the process prior to execution of this process. With this configuration, even when the communication quality between the server device 10 and the terminal device 20 temporarily declines, for example, the probability of the process being immediately interrupted declines. In addition, in the terminal devices 20, even when an improper process is executed such as overwriting a parameter, for example, the probability that the improper process will be rejected increases.

(Overview of the Game)

An overview of a game according to this embodiment will be described. The game according to this embodiment includes one or more game parts. Of these game parts, at least one game part may be executed using the below-described game media.

The game media is electronic data used in the game, and for example includes arbitrary media such as cards, items, virtual currency, tickets, characters, avatars, level information, status information, parameter information (health points, attack power and the like), and ability information (skills, abilities, spells, jobs and the like), for example. In addition, the game media is electronic data that can be acquired, owned, used, managed, exchanged, synthesized, strengthened, sold, discarded, gifted or the like by the user in the game, but the usage conditions of the game media are not limited to those explicitly stated in this specification.

Below, except when explicitly stated, "game media the user possesses" shall indicate game media associated, as possessed game media, with a user ID capable of uniquely identifying the user. In addition, "granting game media to the user" shall indicate associating game media with the user ID as possessed game media. In addition, "discarding game media the user possesses" shall indicate cancelling the association between the user ID and the possessed game media. In addition, "consuming game media the user possesses" shall indicate that some kind of effect or influence is evoked in the game in accordance with cancellation of the association between the user ID and the possessed game media. In addition, "selling game media the user possesses" shall indicate cancelling the association between the user ID and the possessed game media and associating, as possessed game media, other game media (for example, virtual currency, an item or the like) with the user ID. In addition, "transferring to user B game media user A possesses" shall indicate cancelling the association between the possessed game media and the user ID of user A, and associating that game media with the user ID of user B as possessed game media. In addition, "creating game media" shall indicate defining or determining at least a portion of the information relating to the game media.

The game part may include arbitrary content a user can play in a game. The game part may include content such as a quest; a mission; a mini-game; obtaining, cultivating, strengthening and synthesizing game media; searching the virtual space; and attacks such as competing against an opponent (for example, another user, Artificial Intelligence (AI) or the like), for example. In each game part, one or more prescribed game tasks may be set. When it is determined that success has been achieved in one or more game tasks set for the game part being played by the user, game media or the like, for example, may be granted as a reward to the user. For game tasks, arbitrary tasks can be utilized in accordance with the content of the game part, such as a task of winning a competition against an enemy character, the task of achieving a goal point in the virtual space, the task of ensuring that the user's character does not attain a prescribed status (for example, a status of health points being zero) before a prescribed time has elapsed, or the like. In addition, achieving a prescribed game task (completed task) out of one or more game tasks set in the game part shall be called completing the game part. When a user playing a game part has succeeded in achieving a completed task, it is determined that the game part has been completed and that game part may end.

In one or more game parts, a game part for single play and a game part for multi play may be included. A game part for single play is a game part that may be executed on the basis of user operation by one terminal device 20 used by one user (for example, a game part for one person). A game part for single play is executed by one terminal device 20 alone or one terminal device 20 and the server device 10 working together. On the other hand, a game part for multi play is a game part in which a maximum of two or more users can participate (for example, a game part for a plurality of people). The game part for multi play can be executed on the basis of user operation by a plurality of terminal devices 20 respectively used by a plurality of users. The game part for multi play may be configured so that participation and progress is synchronized among the terminals, or may be configured so that participation and progress is not synchronized among the terminals. Game parts in common to two or more users may include game parts in which at least a portion of the progress process of the game part and at least a portion of the process results are applied in common to two or more users. Two or more terminal devices 20 work together or two or more terminal devices 20 and the server device 10 work together, to execute the game part for multi play.

Figure 6:
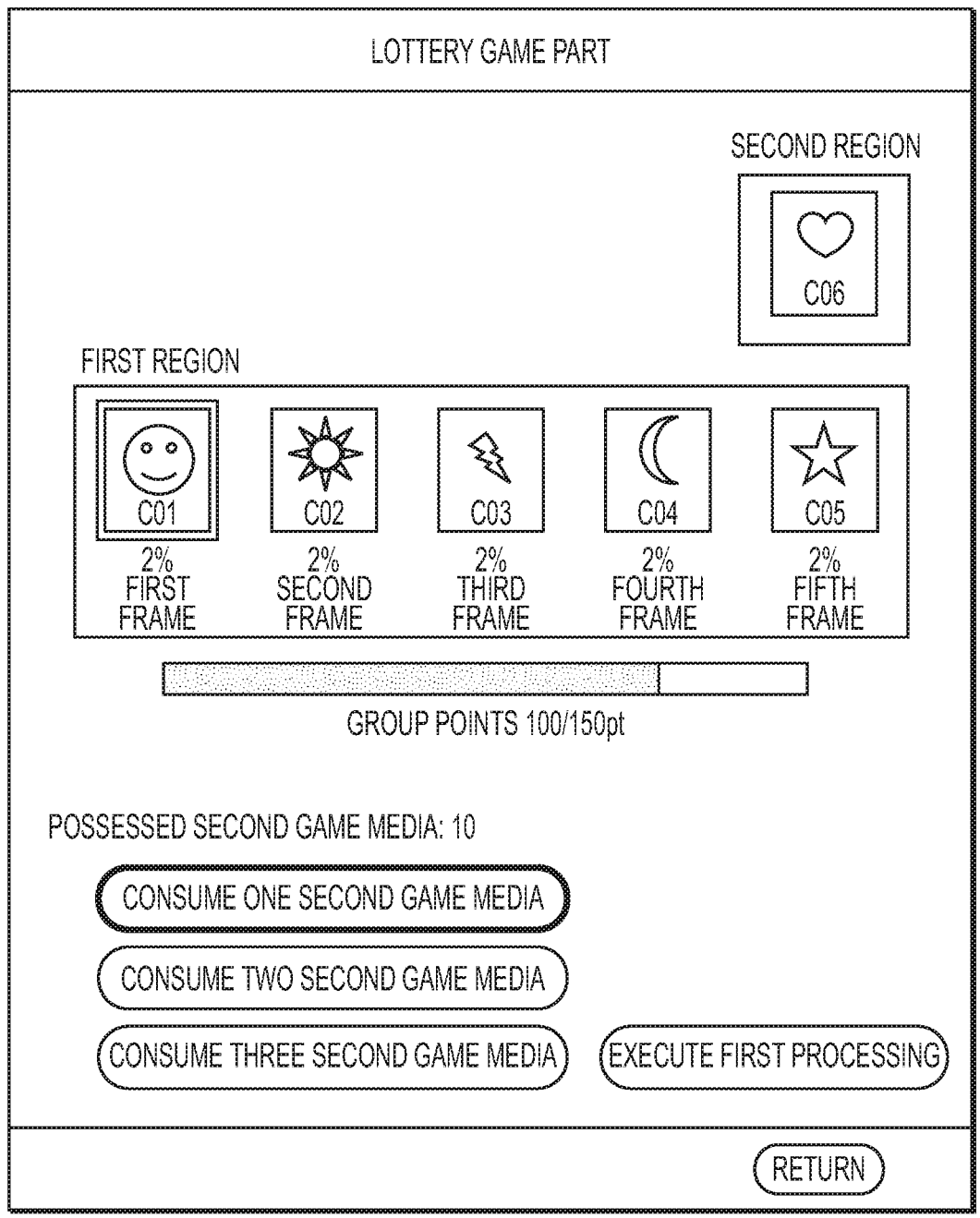
FIG. 6 is one example of a screen of the game part.

As the game part according to this embodiment, a lottery game part in which winning game media are determined that will be granted to the user from among a plurality of game media that are the objects of the lottery may be included. A portion of the plurality of game media is first game media selected from among a plurality of first game media. Game media that has high usage value or high rarity value in the game may be considered the first game media. When starting the lottery game part, the first game media included in the object of the lottery this time is determined from among the first game media and, as shown in FIG. 6, is displayed on a game screen. After viewing the displayed first game media, the user starts the lottery game part. Each time the lottery game part is executed, the first game media included in the objects of the lottery changes. For example, each time the lottery game part is executed, at least one of the first game media included in the objects of the lottery is replaced by another of the first game media. In this manner, each time the lottery game part is executed, the first game media included in the objects of the lottery change, so it is possible to provide motivation to the user to repeatedly play the lottery game part, thereby improving the user's desire to continue the game.

(Server Device Configuration)

A configuration of the server device 10 will be described in detail. The server device 10 is provided with a server communication unit 11, a server memory unit 12 and a server controller 13.

The server communication unit 11 is provided with an interface for accomplishing sending and receiving of information, and accomplishes wired or wireless communication with external devices. The server communication unit 11 may be provided with a wireless local area network (LAN) communication module or a wired LAN communication module or the like. The server communication unit 11 can send information to and receive information from the terminal device 20 via the network 30.

The server memory unit 12 is provided with semiconductor memory, magnetic memory, optical memory or the like, for example. The server memory unit 12 may function as a primary memory device or a secondary memory device, for example. In addition, the server memory unit 12 may be a volatile memory device or may be a non-volatile memory device. Furthermore, the server memory unit 12 may also be cache memory or the like for a processor included in the below-described server controller 13. The server memory unit 12 stores information and programs used in execution of the game. At least a portion of the information and programs stored in the server memory unit 12 may be shared and synchronized with the terminal device 20. Below, an example of information stored by the server memory unit 12 is described.

(Information Relating to Users)

The server memory unit 12 stores information relating to a plurality of users. The information relating to users will be described with reference to FIG. 2. The information relating to users may include arbitrary information unique to users used in the game. The information relating to users is information for the user to operate the game, and is created for each user. For example, the information relating to users includes user ID, user name, possessed second game media, possessed game media, cooperating user information, group points and the like.

The user ID is information that can uniquely identify the user. Below, the user ID is also simply called the user. The user ID may be managed in conjunction with information that can unique identify the terminal device. Through this, the server device 10 can use the user ID to specify the terminal device used by that user.

The user name is information indicating the name of the user. The user name differs from the user ID, and need not uniquely identify the user. The user name may be arbitrarily settable or changeable according to user operation of the terminal device 20.

The possessed second game media is information relating to the second game media the user possesses within the game. The second game media is game media that can be consumed in order for the user to execute a game part. The second game media may include cards, items, virtual currency, tickets or the like, for example. The possessed second game media may include a game media ID for uniquely specifying the second game media. The possessed second game media may include arbitrary information relating to the second game media, and is not limited to game media ID. For example, information on the quantity or classification of the second game media may be included in the possessed second game media.

The possessed game media is information relating to the game media the user possesses within the game. For example, a game media ID for uniquely identifying the game media may be included in the possessed game media. Game media that is granted to the user as selected game media in the below-described game part may be included in the possessed game media. For explanatory purposes, in this embodiment an example is shown in which the second game media and game media besides this possessed by the user are distinguished and managed, but this is intended to be illustrative and not limiting. For example, the second game media may be managed the same as game media other than the second game media as a portion of the possessed game media.

The cooperating user information is information used when specifying users that can exhibit a prescribed game result in the game part. Other users associated with the user in one direction or two directions may be included in the cooperating users. For example, users followed by that user, followers, friends or the like may be included in the cooperating users. The cooperating user information may include a user ID for unique specifying users. For example, two users may accomplish a user operation for becoming cooperating users with each other in the game, and through this the mutual user IDs may be set as cooperating user information. In such a case, when a prescribed game result is exhibited in the game part of a given user, the prescribed game result can be exhibited in the game part of the users set in the cooperating user information of that user. The cooperating user information is such that information specifying a user group in which a plurality of users can participate may be set. In such a case, when a prescribed game result is exhibited in the game part of a given user, the prescribed game result is also exhibited in the game parts of other users included in the user group set in the cooperating user information of that user. The number of users that can be specified by the cooperating user information may be an arbitrary number. The prescribed game result may also be exhibited in the game part of a portion of the users out of the users set in the cooperating user information.

The group points is information shared among users set in the above-described cooperating user information. In this embodiment, when prescribed game media is determined as the selected game media by the first processing in the game part a given user is executing, group points may be granted to that user and users set in the cooperating user information of that user. Game media may be granted to a user in accordance with the group points granted to that user.

(Information Relating to Game Media)

The server memory unit 12 stores information relating to a plurality of game media. The information relating to game media will be described with reference to FIG. 3 and FIG. 4. The information relating to game media may include arbitrary information unique to the game media used within the game. The information relating to game media is created for each of the game media. In this embodiment, information that differs between the second game media and game media other than that may be included.

The second game media is game media consumed in order for the user to execute a game part. The second game media may include cards, items, virtual currency, tickets and the like, for example. The information relating to the second game media may include the game media ID and classification, for example as shown in FIG. 3.

The game media ID is information that can unique identify the game media. Below, the game media ID is also called simply the game media.

The classification is information indicating the classification of the second game media. In this embodiment, the conditions of the second game media to be consumed are set as execution conditions of the game part. When the conditions of the classification of the second game media are set as conditions for executing the game part, when the user possesses second game media of the classification set as an execution condition, the game part can be executed by that user.

In this embodiment, the information relating to the game media other than the second game media may include game media ID, game media name, rarity, first game media flag, second probability and game result flag, for example as shown in FIG. 4.

The game media ID is information that can uniquely identify the game media as described above. Below, the game media ID at times is referred to simply as the game media.

The game media name is information relating to the name of the game media. The game media name differs from the game media ID and need not be able to uniquely identify the game media.

The rarity is information indicating the degree of rarity of the game media. The value, usage conditions or result exhibited by usage of that game media in the game may change in accordance with the rarity. The rarity may be expressed by numerical information, for example. Or, a plurality of categories may be prepared as the rarity, and any of these may be assigned as the rarity to the game media. In this embodiment, the four categories of normal, rare, super-rare and ultra-rare are prepared in ascending order of rarity, and any one of these is assigned as the rarity to the game media.

The first game media flag is information used when specifying the first game media in the game media. In this embodiment, the first game media is game media that can be displayed in a first region on a game screen, details of which are described below. The first game media flag may be set for arbitrary game media. For example, the first game media flag may be set for game media with high rarity, or for game media that can be acquired only in a specific game part. The first game media flag may be set again in each game part. In FIG. 4, the game media with game media IDs of C01-C10 for which the first game media flag has been set to "0" are used as the first game media.

The second probability is information used in the second processing that determines the first game media in the game part as described in detail below. For example, the second probability may be the selection probability set for each of the first game media used when selecting first game media from among a plurality of the first game media by the second processing. The second probability may be assigned to game media specified as the first game media by the first game media flag. For example, in FIG. 4, a selection probability of 10% has been set for the second probability in the game media with game media IDs of C01-C10. In such a case, the first game media may be determined with a selection probability of 10% each among the first game media of C01-C10 by the second processing. The second probability associated with the first game media is not limited to the same value and may be arbitrary values. For example, the second probability may be set to a lower selection probability, the higher the rarity of the first game media.

The game result flag is information used to specify the game media that can exhibit a prescribed game result when determined as the selected game media by the first processing. The prescribed game result may include granting the above-described group points to a user, generating a prescribed game event, displaying information indicating that a prescribed game result has been exhibited or the like, for example. The game result flag may be granted to arbitrary game media out of the first game media. For example, the game result flag may be set for the first game media for which a prescribed value has been set for the rarity of the first game media. In this embodiment, the game result flag may be set to "0" for game media with a rarity of ultra-rare, out of the game media for which the first game media flag is set to "0". In FIG. 4, the game media with a game media ID of C01 and C10 have a rarity of ultra-rare, and the first game media flag is set to "0", so the game result flat is set to "0".

(Information Relating to Game Part)

The server memory unit 12 stores information relating to game part. The information relating to game part includes arbitrary information unique to that game part. For example, as shown in FIG. 5, the information relating to game part may include game part ID, game part name, user information, first region information, second region information, total first probability other than the first region, and the like.

The game part ID is information that can uniquely identify the game part. Below, the game part ID at times is referred to simply as the game part.

The game part name is information indicating the name of the game part. The game part name differs from the game part ID and need not uniquely identify that game part.

The user information is information that can uniquely identify the user executing the game part. The above-described user ID, for example, can be set as the user information. The information relating to the game part may be created one at a time for each user. When the game part is initially executed by a user, information relating to the game part having the user ID of that user in the user information may be created. Following this, the information relating to the game part may be updated each time that user executes the game part.

The first region information is information relating to the first game media displayed in the first region on the game screen, in the game part. Information relating to an arbitrary number of first game media may be included in the first region information. For example, in FIG. 5, information relating to five first game media is set in the first region information of the information relating to the game part. In the information relating to each of the first game media, a "game media ID" and a "first probability" may be included for specifying the first game media. The "first probability" is information used in the first processing that specifies the selected game media from among the plurality of game media in the game part as described in detail below. For example, in FIG. 5, a 2% selection probability is set as the first probability of the five first game media. In such a case, the probability that each of the five first game media will be determined to be the selected game media from among the plurality of game media by the first processing is equally 2%. The first probability associated with the first game media is not limited to the same value and may be arbitrary values. For example, the first probability may be such that the lower the selection probability that is set, the higher the rarity of the first game media. In addition, a "total first probability of the first region" may be included in the first region information. In such a case, the first probability of the first game media included in the first region may be set in accordance with the first game media included in the first region so that the total value thereof is equal to the value set in the "total first probability of the first region." For example, an example will be described in which the first probability of the first game media included in the first region is set in accordance with the rarity of the first game media included in the first region. As shown in FIG. 5, when the total first probability of the first region is 10%, when the scarcities of the five first game media included in the first region are equal to each other, each of the first probabilities of the first game media may be set equally to 2%. Or, when one of the five first game media has a higher rarity than the other, the first probability of that first game media may be set to 0.4% and the other first game media set to 2.4% each, so that the values differ in accordance with rarity and the total becomes 10%.

The second region information is information relating to the first game media displayed in the second region on the game screen, in the game part. The second region information may include information uniquely specifying an arbitrary number of the first game media. For example, in FIG. 5, the game media ID of one of the first game media is set in the second region information of each of the game parts.

The total first probability other than the first region is information indicating the total of the first probability set for the game media other than the first game media of the first region, out of the plurality of game media, when determining the selected game media from among the plurality of game media by the first processing. An arbitrary number of game media may be included in the game media other than the first game media included in the first region. For example, in the game media other than the first game media included in the first region, in FIG. 4, the game media C11-C14 for which "0" has not been assigned for the first game media flag may be included. In such a case, the information specifying each of the game media C11-C14, and the first probability thereof, may be set in the "total first probability other than the first region." Or, when the first probabilities of the game media C11-C14 are equal, the total value of the first probabilities of the game media C11-C14 may be set.

The server controller 13 shown in FIG. 1 includes one or more processors. The processors may include general-use processors, and may include special-use processors that specialize in specific processes. The server controller 13 controls operation of the server device 10 as a whole. Below, an example of the operation of the server controller 13 is described in detail.

The server controller 13 stores various items of information and programs used in the game process in the server memory unit 12. The information used in the game process may include the above-described information relating to the user, information relating to the game media, and the like.

The server controller 13 accomplishes the sending and receiving of information via the server communication unit 11. For example, the server controller 13 may send to the terminal device 20 at least a portion of the information stored in the server memory unit 12. In this manner, information stored in the server memory unit 12 and information stored in the terminal device 20 are shared and synchronized. The timing for accomplishing sharing and synchronization of the information may include, for example, the timing with which new information is stored in the server memory unit 12 and the timing with which information is updated in the server memory unit 12, but this may be arbitrarily determined. In addition, for example the server controller 13 may receive arbitrary information determined or input in the terminal device 20, via the server communication unit 11. This information may, for example, include information input through user operation.

The server controller 13 accomplishes the sending and receiving of information among the plurality of terminal devices 20 via the server communication unit 11. For example, when an instruction is received from the terminal device 20A to send an arbitrary item of information to the terminal device 20B, the server controller 13 transmits the arbitrary item of information to the terminal device 20B via the server communication unit 11. In addition, when an instruction is received from the terminal device 20A to cause an arbitrary item of information to be retrieved from the terminal device 20B, the server controller 13 retrieves the arbitrary item of information from the terminal device 20B and transmits this to the terminal device 20A, via the server communication unit 11. One instruction may include instructions for sending information to and acquiring information from a plurality of terminal devices.

The server controller 13, working together with the terminal device 20, executes the game. For example, the server controller 13, working together with one or more terminal devices 20, executes the game part. Details of the operation of the server device 10 and the terminal devices 20 executing the game part are described below.

(Configuration of the Terminal Device)

A configuration of the terminal device 20 will be described in detail. As shown in FIG. 1, each terminal device 20 is provided with a terminal device communication unit 21, a terminal device memory unit 22, a display unit 23, an input unit 24 and a terminal controller 25.

The terminal communication unit 21 is provided with an interface that accomplishes wired or wireless communication with an external device, and accomplishes the sending and receiving of information. The terminal communication unit 21 may be provided with a wireless communication module compatible with a mobile communication standard such as Long Term Evolution (LTE®) or the like, a wireless LAN communication module, a wired LAN communication module or the like, for example. The terminal communication unit 21 can send information to and receive information from the server device 10 via the network 30.

The terminal memory unit 22 includes semiconductor memory, magnetic memory, optical memory or the like, for example. The terminal memory unit 22 may function as a primary memory device or a secondary memory device, for example. The terminal memory unit 22 may be built into the terminal device 20, or may be connected to the terminal device 20 via an arbitrary interface. In addition, the terminal memory unit 22 may be a volatile memory device, or may be a non-volatile memory device. Furthermore, the terminal memory unit 22 may be cache memory or the like of a processor included within the below-described terminal controller 25. The terminal memory unit 22 stores information and programs used in processing the game. For example, the terminal memory unit 22 may store a game application retrieved from a prescribed application distribution server. The terminal memory unit 22 stores all or a portion of information relating to the user, information relating to the game media and information relating to the groups of the game media, retrieved from the server device 10.

The display unit 23 includes a display device such as a liquid crystal display or an EL display, for example. The display unit 23 can display various screens.

The input unit 24 includes an arbitrary input interface that receives the user's operations. The input interface may include a pointing device such as a mouse or the like, a physical key, and a touch panel provided integrally with the display unit 23, for example.

The terminal controller 25 includes one or more processors. The terminal controller 25 controls operation of the terminal device 20 as a whole. An example of operation of the terminal controller 25 is described in detail below.

The terminal controller 25 accomplishes the sending and receiving of information via the terminal communication unit 21. For example, the terminal controller 25 retrieves information and programs used in the game process. Specifically, the terminal controller 25 may retrieve the game application from a prescribed application distribution server. The terminal controller 25 may retrieve all or a portion of the information relating to game media from the server device 10.

The terminal controller 25 launches the game application in accordance with user operation. The terminal controller 25 works together with the server device 10 and executes the game. For example, the terminal controller 25 causes screens used in the game to be displayed on the display unit 23. On the screen, a plurality of graphic user interfaces (GUI) that detect user operation may be displayed, for example. The terminal controller 25 can detect user operation on the screen, via the input unit 24.

(Game Part Process)

The operation of the server device 10 and the terminal device 20 working together to execute the game part will be described in detail. Here, the description will be for a configuration in which the server device 10 and the terminal device 20 each execute the same process, and the server device 10 compares the process results of the server device 10 and the process results of the terminal device 20. To simplify the description, operation of the terminal device 20 will be described, and description of the operation of the server device 10, which executes the same process as the terminal device 20, will be omitted.

The terminal controller 25 stores in the terminal memory unit 22 information relating to the user using the terminal device 20, the game media and the game part. The terminal controller 25 may start this process with an arbitrary timing. For example, the terminal controller 25 may start this process when the game is launched. When the game part is initially started by a user, the terminal controller 25 may create information relating to the game part having the user ID of that user in the user information. After the game part has been started, the terminal controller 25 updates and refreshes the information relating to the user, the game media and the game part in accordance with progress of the game part.

The terminal controller 25 displays one or more items of information relating to the first game media in the first region on the screen. Arbitrary information may also be displayed in the information relating to the first game media displayed on the screen. For example, information relating to the first game media displayed on the screen may also include an image of the first game media, the game media ID or the first probability or the like. Below, "displaying information relating to the first game media" on the game screen is also simply called "displaying the first game media" on the game screen. The terminal controller 25 may display first game media set in the first region information of the information relating to the game part in the first region. The information relating to the first game media included in the first region information of the information relating to the game part may also be managed in association with the display position in the first region of the game screen. For example, the first game media 1 through first game media 5 included in the first region information shown in FIG. 5 may also be respectively displayed in the first frame through fifth frame of the first region shown in FIG. 6. When the first game media is not yet set in the first region information of the information relating to the game part, the terminal controller 25 determines the first game media to be set in the first region information. The terminal controller 25 may determine the first game media to be set in the first region information from among a plurality of first game media. For example, the terminal controller 25 may determine the first game media to be set in the first region information from among the plurality of first game media on the basis of a prescribed selection probability associated with the first game media, such as the second probability shown in FIG. 4. When there is a plurality of the first game media displayed in the first region, the first game media displayed in the first region may be determined solely by the number of frames without permitting superimposition from among the plurality of media, or may be determined solely by the number of frames while permitting superimposition from among the plurality of media. For example, in the first frame through fifth frame included in the first region shown in FIG. 5, five differing first game media may be displayed, or five first game media including a plurality of the same first game media may be displayed.

The terminal controller 25 displays at least one first game media in the second region on the screen. The terminal controller 25 may display in the second region the first game media set to the second region information of the information relating to the game part. When the first game media is not yet set in the second region information of the information relating to the game part, the terminal controller 25 determines the first game media to be set to the second region information. The terminal controller 25 may determine the first game media to be set in the second region information from among the plurality of first game media. For example, the terminal controller 25 may determine the first game media to be set in the second region information from among the plurality of first game media on the basis of a prescribed selection probability associated with the first game media, such as the second probability shown in FIG. 4. Or, the terminal controller 25 may determine the first game media to be set in the second region information in ascending order of game media ID from among the plurality of first game media. The terminal controller 25 may display in the second region one of the first game media set in the second region information of the information relating to the game part, as shown in FIG. 6.

The terminal controller 25 receives in the input unit 24 a first processing request to determine the selected game media from among the plurality of game media including at least the first game media displayed in the first region. When the first processing request is received, the terminal controller 25 executes the first processing and determines the selected game media. The terminal controller 25 may determine the selected game media from among the plurality of game media by executing an arbitrary process, as the first processing. For example, the terminal controller 25 may set as the plurality of game media the game media set in the first region information of the information relating to the game part shown in FIG. 5, and the game media for which "O" is not set in the first game media flag out of the game media shown in FIG. 4. For example, suppose the terminal controller 25 displays the five first game media C01, C02, C03, C04 and C05 in the first region. The terminal controller 25 may execute as the first processing a process that determines one selected game media on the basis of the first probability associated with each of the game media, from among the plurality of game media as a whole including the game media C11-C14 and the first game media C01-C05. When there is a plurality of selected game media, the process of determining the selected game media may be repeated in the first processing that number of times.

The terminal controller 25 may receive the first processing request in the input unit 24 indicating the second game media to be consumed for the first processing. The terminal controller 25 may execute the first processing by correcting the first probability determined in the selected game media by the first processing of the game media of at least a portion out of the plurality of game media, in accordance with the second game media consumed for the first processing. For example, the terminal controller 25 may change the first probability on the basis of a combination of the number, classification, or combination of number and classification of the second game media that is consumed. For example, the greater the number of second game media to be consumed, the more the terminal controller 25 may increase the probability that the first game media displayed in the first region is determined as the selected game media, and the more it may reduce the probability that game media other than this is determined as the selected game media. Furthermore, for example when the number of second game media to be consumed is a prescribed number, the terminal controller 25 may correct the probability that any of the first game media displayed in the first region is determined to be the selected game media to 100% and correct the probability that game media other than this is determined to be the selected game media to 0%.

For example, the terminal controller 25 determines the selected game media on the basis of the respective first probabilities, from among the plurality of game media including the five first game media C01-C05 displayed in the first region on the screen, and the game media C11-C14 other than these. The teminal controller 25 may make the total value of the first probabilities of the first game media each displayed in the first region 10%, 20% or 100% when the number of second game media consumed is 1, 2 or 3, for example. The terminal controller 25 executes the first processing with the first probabilities of the first game media C01-C05 each as 2% and the total of the first probabilities of the game media other than these as 90%, when the number of second game media to be consumed is one, in the game part G01 of FIG. 5. The terminal controller 25 executes the first processing with the first probabilities of the first game media C01-C05 each 4% and the total of the first probabilities of the game media other than these as 80%, when the number of second game media to be consumed is two. The terminal controller 25 executes the first processing with the first probabilities of the first game media C01-C05 as 20% each and the total of the first probabilities of the game media other than these as 0%, when the number of second game media to be consumed is three. In such a case, any of the first game media C01-C05 is determined to be the selected game media by the first processing. In this manner, the user can determine the second game media to be consumed for the first processing, in accordance with the first game media displayed in the first region.

In addition, the terminal controller 25 may execute the process of determining the selected game media by repeating a determination of whether or not to make each of the game media included in the plurality of game media the selected game media, as the first processing. For example, suppose that as the plurality of game media, the five first game media C01, C02, C03, C04 and C05 displayed in the first region are included as the plurality of game media and a first probability of 2% is set for each. In such a case, the terminal controller 25 may execute as the first processing five determinations, namely a determination of whether or not the first game media C01 is made the selected game media with a 2% probability, a determination of whether or not the first game media C02 is made the selected game media with a 2% probability, a determination of whether or not the first game media C03 is made the selected game media with a 2% probability, a determination of whether or not the first game media C04 is made the selected game media with a 2% probability and a determination of whether or not the first game media C05 is made the selected game media with a 2% probability. Through this, the terminal controller 25 with one first processing can determine at a maximum all of the first game media displayed in the first region as the selected game media. Or, there may also be cases in which the terminal controller 25 does not determine even one of the first game media as the selected game media in one first processing. In addition, as described above, when the number of second media to be consumed is three and the first probabilities of the first game media C01-C05 are each 20%, the terminal controller 25 may execute as the first processing a determination of whether or not to make a selected game media with 20% probability for each of the first game media C01-C05.

Figure 8:
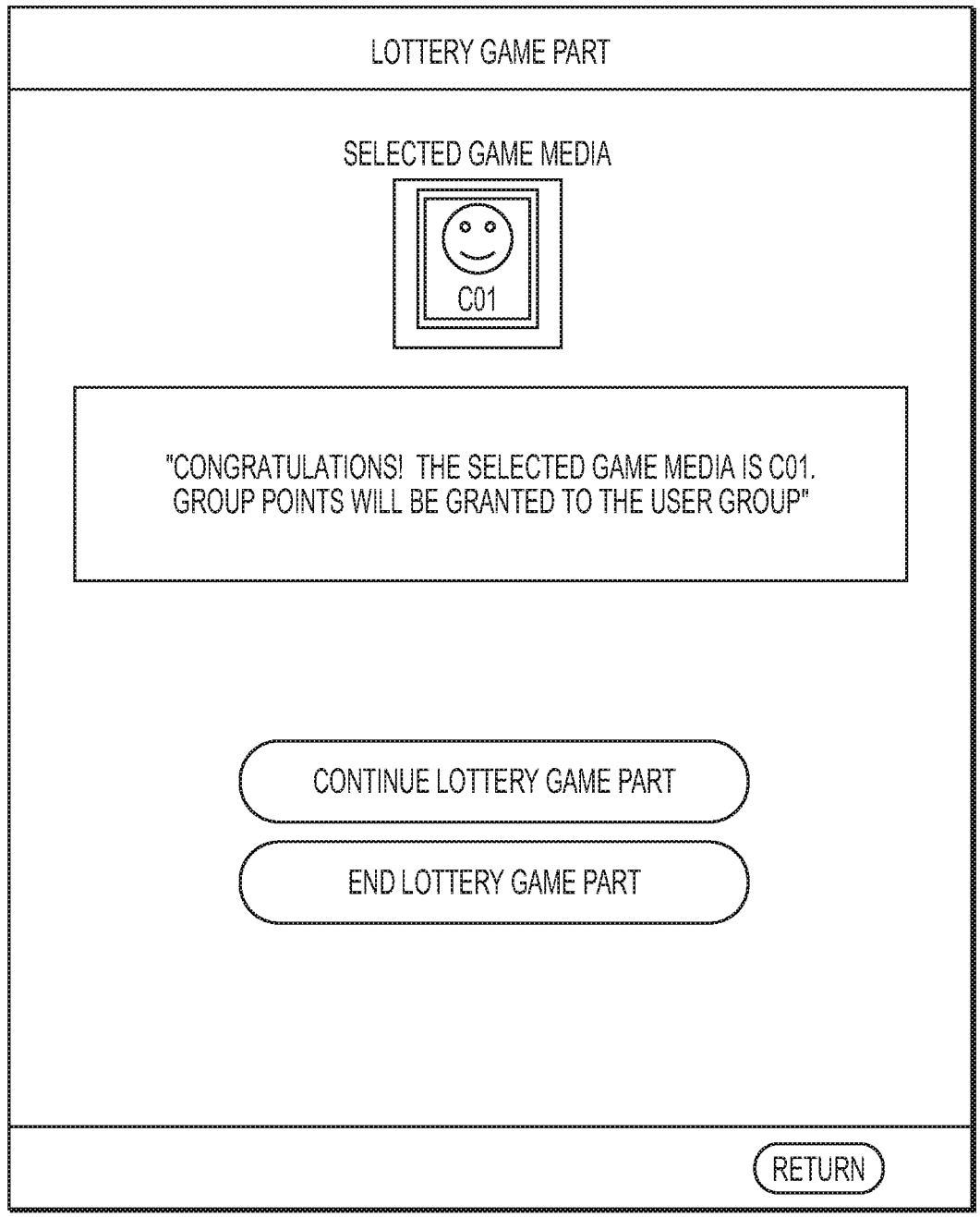
FIG. 8 is another example of a screen of the game part.

The terminal controller 25 displays on the display unit 23 information relating to the selected game media determined by the first processing. The terminal controller 25 may display the image, the game media ID and the game media name and the like of the selected game media, as information relating to the selected game media, as shown in FIG. 8. The terminal controller 25 may associate the ID of the selected game media with the unique game media of the information relating to the user, in order to grant the selected game media to the user. Below, "displaying the information relating to the selected game media" is also referred to simply as "displaying the selected game media" on the game screen.

The terminal controller 25 changes at least a portion of the first game media out of the one or more first game media displayed in the first region with other first game media, each time the first processing is executed. The terminal controller 25 may update by deleting at least a portion of the information relating to the first game media set in the first region information associated with the information relating to the game part and adding information relating to other first game media. The terminal controller 25 may display the updated first game media set in the first region information in the first region. The terminal controller 25 may hide at least a portion of the first game media changed to the other first game media out of the one or more first game media displayed in the first region and display the changed other first game media in the first region, when changing the first game media in the first region to the other first game media. For example, the terminal controller 25 may hide the first game media removed from the first region information of the information relating to the game part in the first region, and display in the first region the new first game media added to the first region information. The number of first game media changed at one time by the terminal controller 25 may be an arbitrary number. In addition, the terminal controller 25 may detect that the first processing has been executed by an arbitrary method. For example, when the first processing is executed by the server device 10, the terminal controller 25 may detect that the first processing was executed by receiving from the server device 10 an instruction to cause the display of the selected game media determined by the first processing.

Figure 7:
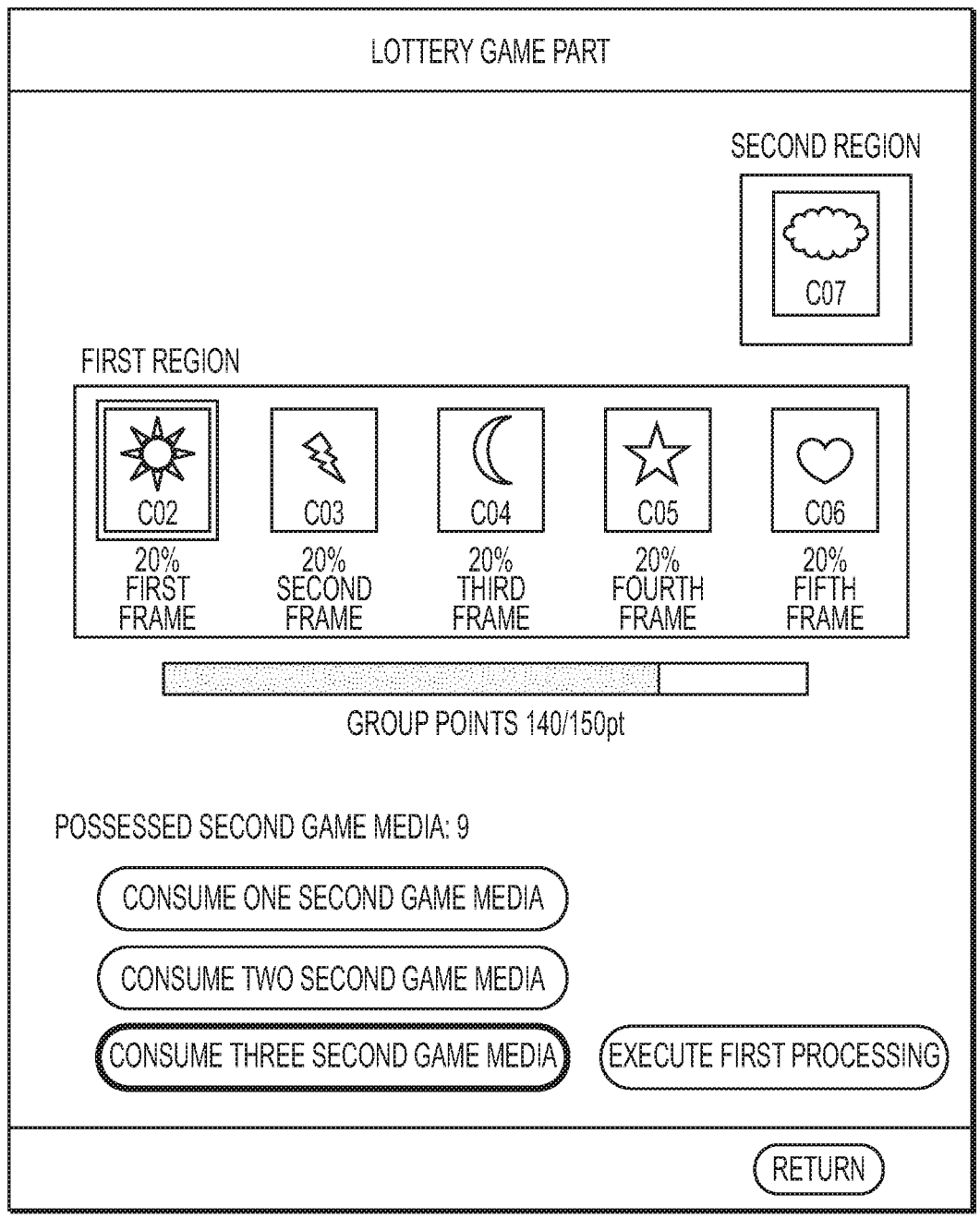
FIG. 7 is another example of a screen of the game part.

Furthermore, the terminal controller 25 may manage the first region information with a first-in first-out (FIFO) queue construction. In such a case, the terminal controller 25 deletes the first game media added to the queue construction first out of the first game media stored in the queue and adds at the back of the queue construction a new first game media, each time the first processing is executed. In the first region, one or more of the first game media may be displayed lined up in a row, as shown in FIG. 6. Furthermore, in the first region, one or more of the first game media may be displayed lined up in a row in the order stored in the queue of the first region information. In such a case, at least a portion of the game media changed to the other first game media out of the first game media displayed in the first region is positioned at the end of the row. When changing the first game media of the first game media in the first region as discussed above to the other first game media, the terminal controller 25 may hide the first game media of at least the portion to be changed while causing one or more of the first game media displayed in the first region to slide to the side of one end along the row, and display the other first game media being changed at the other end of the row. For example, suppose that the terminal controller 25 stores the five first game media C01, C02, C03, C04 and C05 in the first region information in that order and displays such in a single row from the left of the first region, as shown in FIG. 6. When the first processing is executed, the first controller 25 may delete the first game media C01 at the head of the first region information and add at the end of the first region information the new first game media C06. In such a case, the first game media C01 at the left end of the first region is hidden, C02-C05 are slid to the left and the new first game media C06 is displayed at the right end. Through this, the five first game media C02, C03, C04, C05 and C06 are displayed in the first region, as shown in FIG. 7.

The first controller 25 may, when changing the first game media in the first region to other first game media, make at least one of the first game media displayed in the second region the other first game media. Suppose that the terminal controller 25 displays the five first game media C01, C02, C03, C04 and C05 in the first region, and displays the one first game media C06 in the second region, as shown in FIG. 6. When the first processing is executed, the terminal controller 25 may hide the C01 displayed in the first region and display in the first region the C06 displayed in the second region. As a result, the five first game media C02, C03, C04, C05 and C06 are displayed in the first region, as shown in FIG. 7.

The terminal control device 25 may determine the first game media to be displayed in the second region from among the plurality of the first game media by a second processing, each time the first processing is executed. The terminal controller 25 may display in the second region the first game media set in the second region information of the information relating to the game part as described above. In such a case, the terminal controller 25 may execute the second processing and determine the first game media to be set in the second region information from among the plurality of the first game media. For example, the terminal controller 25 may determine the first game media to be set in the second region information on the basis of respectively equal selection probabilities from among the plurality of first game media. Or, the terminal controller 25 may determine the first game media to be set in the second region information from among the plurality of first game media on the basis of the prescribed selection probability associated with the first game media, such as the second probabilities shown in FIG. 4. The terminal controller 25 may correct the second probabilities of the first game media displayed in the first region and execute the second processing. For example, the terminal controller 25 may reduce the probability that the first game media displayed in the first region will be determined to be the first game media displayed in the second region, and increase the probability that the first game media other than this will be determined to be the first game media displayed in the second region. For example, suppose the terminal controller 25 displays the five first game media C01, C02, C03, C04 and C05 in the first region. In such a case, the terminal controller 25, when determining the first game media to be displayed in the second region, may exert control to lower the second probability of the first game media C01-C05 and raise the second probability of the other first game media C06-C10, so that the first game media C06-C10 are more readily determined to be the first game media to be displayed in the second region.

The game part may be a game part that is played by a plurality of users. In such a case, when the selected game media determined by the first processing is a prescribed first game media, the terminal controller 25 may cause information indicating the manifestation of prescribed game results to a plurality of users including the user of the terminal device 20 to be displayed on the display unit 23. For example, the plurality of users may include users set as cooperating users in the game with the user of the terminal device 20. Or, the plurality of users may include users participating in the same user group as the user of the terminal device 20. The plurality of users may include an arbitrary number of users. When the prescribed game result is exhibited, the terminal controller 25 causes the consequence of the prescribed game result or a message relating to the exhibited game result to be displayed on the display unit 23.

The terminal controller 25 may display a prescribed first game media with display conditions differing from the other first game media in the first region. The terminal controller 25 may cause the prescribed first game media to be displayed on the display unit 23 so as to exhibit a different visual effect from the other first game media. The visual effect may include, for example, effects such as the size, color, brightness, flashing, font and gradation of the display object. For example, in FIG. 6, the first game media C01 that is the prescribed first game media is displayed in the first region with the frame of the image surrounded by a double line.

One example of the operation of the terminal device 20 in this embodiment will be described with reference to FIG. 6, FIG. 7, FIG. 8 and FIG. 9. First, one example of the operation of the terminal device when a user starts the game part will be described. For example, a user A starts the lottery game part using the terminal device 20A. Here, suppose that the terminal device 20A displays a game screen on a touch panel in which the display unit and the input unit are integrally provided. When the user A first plays the lottery game part, the terminal device 20A determines the first game media C01, C02, C03, C04 and C05 to be displayed in the first region, and the first game media C06 to be displayed in the second region. The terminal device 20A causes a game screen such as that shown in FIG. 6 to be displayed. On the game screen, images of the first game media C01-C05 are displayed in the first region, and an image of the first game media C06 is displayed in the second region. Below the images of the first game media C01-C05 in the first region, the respective first probabilities are displayed. Referring to FIG. 4, the first game media C01 is a prescribed game media in which the game result flag is established, so in the game screen, only the image of the first game media C01 is displayed surrounded by a double line, differing from the other game media. In the game screen, the group points that users of the user group to which user A belongs have acquired and information about the second game media the user A possesses are also displayed. In the game screen, a button is displayed to select the number of second game media to be consumed from one, two or three. When a button is pressed to make the number of the second game media consumed one, two or three, in accordance therewith the first probabilities displayed under the images of the first game media C01-C05 in the first region change to 2%, 4% or 20%. For example, when "consume one of the second game media" is specified and a first processing request is executed, the first processing is executed with the selection probabilities of the first game media display in the first region each being 2%. On the other hand, when "consume three of the second game media" is specified and the first processing request is executed, the selection probabilities of the first game media displayed in the first region each become 20%, and any one of the first game medial C01-C05 displayed on the game screen can be determined as the selected game media by the first processing.

Figure 9:
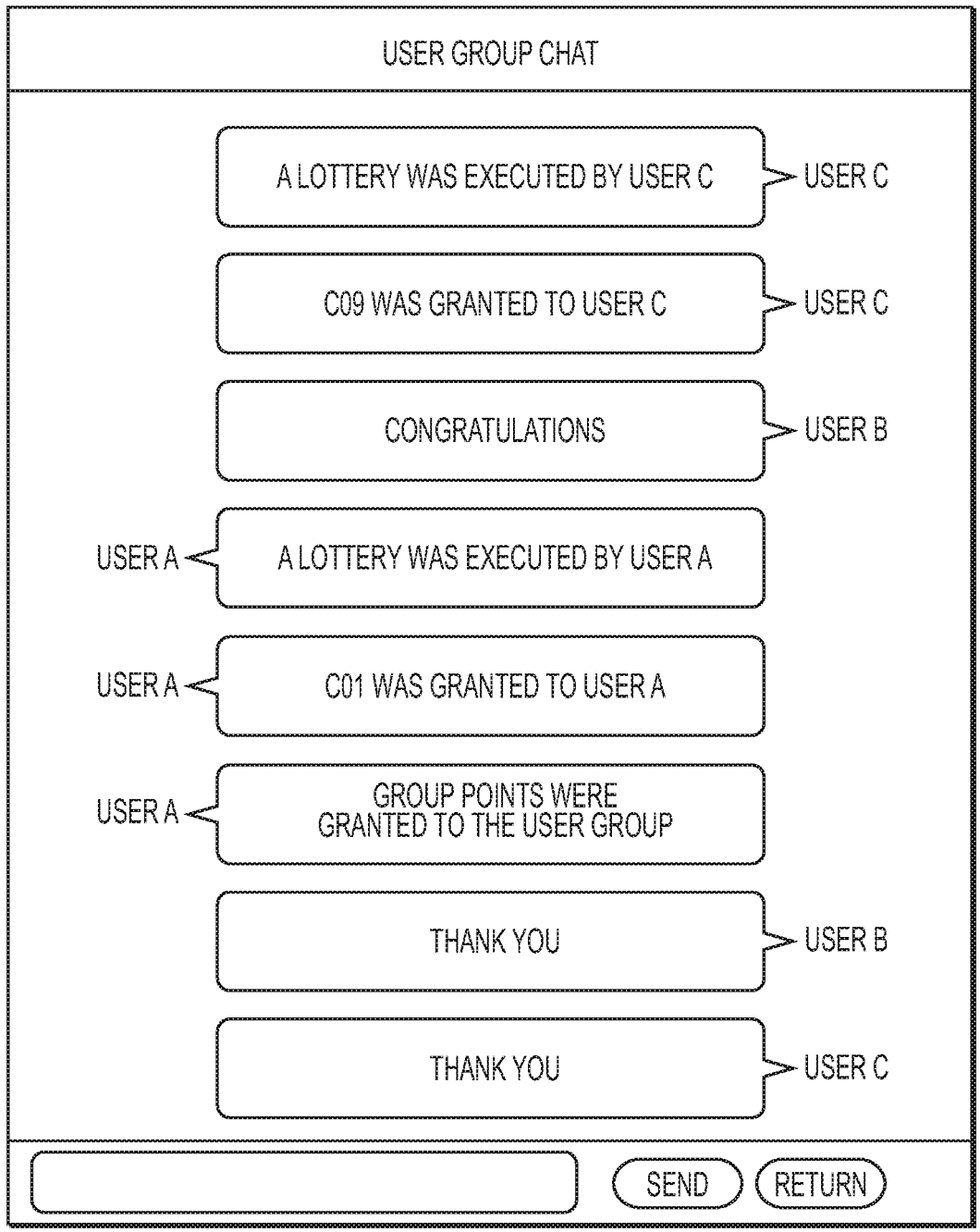
FIG. 9 is another example of a screen of the game part.

When the "execute first processing" button is pressed by the user A, the selected game media is determined by the first processing using the selection probabilities in accordance with the second game media to be consumed, and a game screen indicating the selected game media is displayed as shown in FIG. 8. The selected game media is granted to the user by being associated with the possessed game media of the information relating to the user. When the selected game media is the first game media C01, a message is displayed on the game screen indicating that a prescribed game result has been manifested to users of the user group to which the user A belongs. For example, the prescribed game result may be granting group points to the user. Furthermore, as shown in FIG. 9, a message indicating that the prescribed game result has been manifested is displayed on a chat screen of the user group to which the user A belongs.

In the terminal device 20A, when the first processing is executed, the first game media C01 displayed in the first region is changed to the first game media C06 displayed in the second region, and the first game media C02, C03, C04, C05 and C06 are displayed in the first region. In addition, when the first processing is executed, the second processing is executed. When the first game media C07 is determined from among the plurality of first game media through the second processing, the terminal device 20A causes images of the first game media C02-C06 to be displayed in the first region in the game screen of the lottery game part, and displays the first game media C07 in the second region, as shown in FIG. 7. In FIG. 7, the "possessed second game media" and the value of "group points" are changed accompanying the above-described execution of the first processing. In addition, in the example of FIG. 7, "consume three of the second game media" was selected, so the selection probabilities of the first game media displayed in the first region are each displayed as 20%.

(Example of Operation of the Terminal Device 20)

Figure 10:
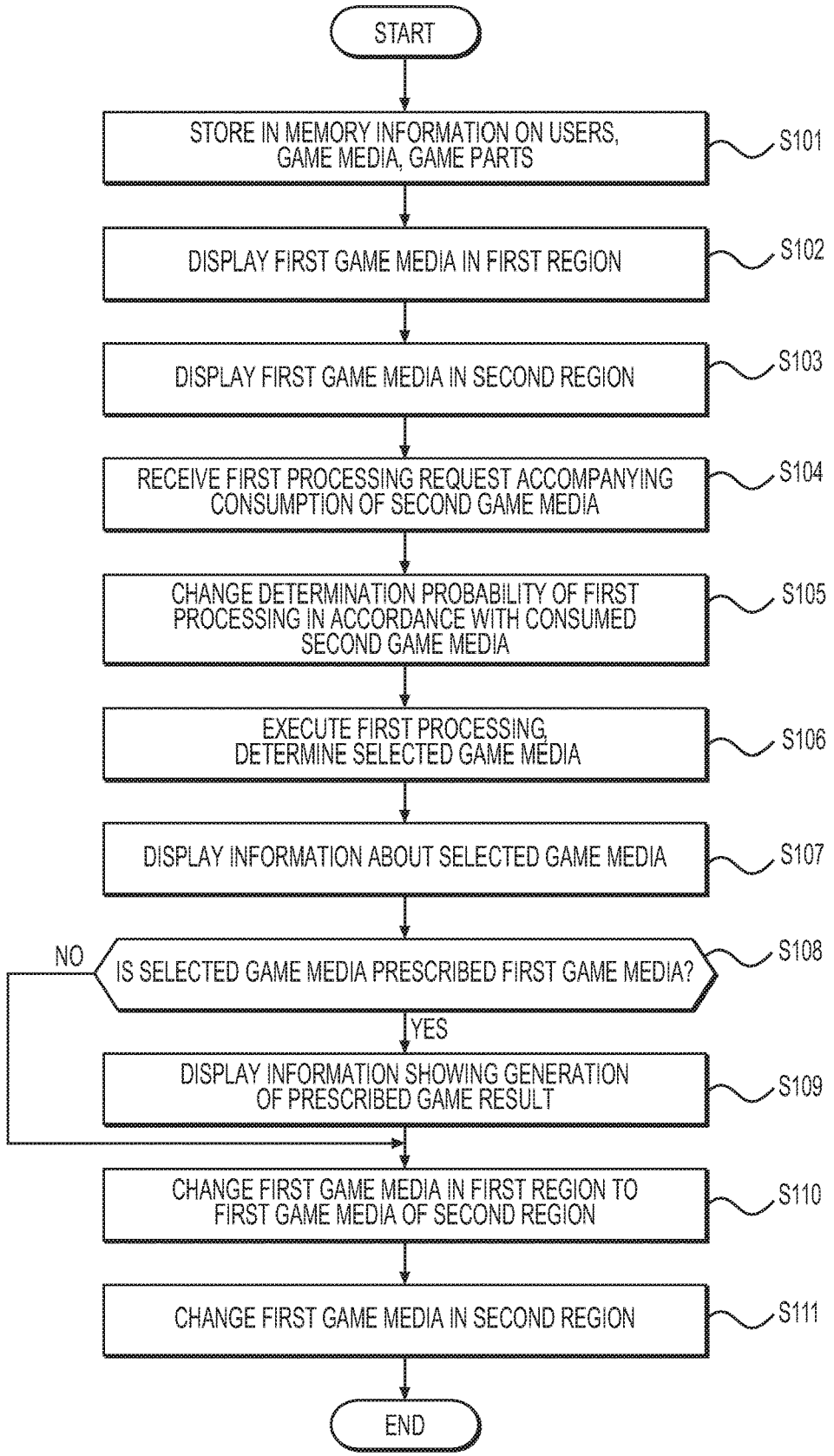
FIG. 10 is a flowchart showing the operation of the terminal device.

An example of the operation of the terminal device 20 according to the embodiment will be described with reference to FIG. 10.

Step S101: The terminal controller 25 stores information relating to the user, the game media and the game part.

Step S102: The terminal controller 25 displays one or more of the first game media in the first region on the screen. The terminal controller 25 causes the display conditions of a prescribed first game media to differ from the other first game media in the first region.

Step S103: The terminal controller 25 displays at least one of the first game media in the second region on the screen.

Step S104: The terminal controller 25 specifies the second game media to be consumed, and receives a request for the first processing to determine the selected game media out of the plurality of game media including at least the first game media displayed in the first region.

Step S105: The terminal controller 25 corrects the first probabilities of the first game media displayed in the first region in accordance with the second game media to be consumed.

Step S106: The terminal controller 25 executes the first processing and determines the selected game media.

Step S107: The terminal controller 25 displays the selected game media determined through the first processing.

Step S108: The terminal controller 25 determines whether or not the selected game media is the prescribed first game media. When the selected game media is not the prescribed first game media (Step S108: No), the terminal controller 25 does not execute the process of step S109.

Step S109: When the selected game media is the prescribed first game media (Step S108: Yes), the terminal controller 25 displays information indicating the manifestation of a prescribed game result to a plurality of users including the user of this terminal device.

Step S110: The terminal controller 25 changes at least a portion of the first game media out of the one or more first game media displayed in the first region to the first game media displayed in the second region.

Step S111: The terminal controller 25 displays in the second region the first game media determined from among the plurality of first game media through the second processing. Following this, the terminal controller 25 ends this process.

As discussed above, the program according to this embodiment causes to be executed, in the terminal device

20, (i) a step that displays one or more first game media in the first region on the screen, (ii) a receiving step that receives a request for the first processing to determine the selected game media from among a plurality of game media including at least the first game media displayed in the first region, (iii) a step that displays the selected game media determined by the first processing, and (iv) a change step that changes at least a portion of the first game media out of the one or more first game media displayed in the first region to other first game media each time the first processing is executed. With this configuration, each time the first processing is executed, the first game media included as objects of the first processing change, so it is possible to motivate the user to repeatedly play the first processing, thereby increasing the user's desire to continue the game. In addition, the user can determine whether or not to accomplish the first processing, knowing in advance the first game media included in objects of the first processing, so game strategizing is improved. For example, when one or more of the game media the user desires, or game media with a high value, are displayed in the first region, the user can play the game with that much more anticipation, thereby making the game more interesting.

With the program according to this embodiment, the terminal device 20 in the change step hides at least a portion of the first game media changed to other first game media out of the one or more first game media displayed in the first region and displays in the first region the other first game media that changed. With this kind of configuration, the predictability of the first game media included as objects of the first processing is increased. Through this, the user can determine whether to focus on the first processing this time or focus on the subsequent or later first processing, based on the information about the first game media displayed in the first region. As a result, game strategizing is improved and the user's desire to continue the game improves.

With the program according to this embodiment, in the first region, one or more of the first game media are displayed lined up in a row, and at least a portion of the game media to be changed to the other first game media is positioned at one end of the row. The terminal device 20 in the change step causes one or more of the first game media displayed in the first region to be slid to the side of one end along the row and hides at least the portion of the first game media that is changed, and also displays at the other end of the row the other first game media being changed. With this kind of configuration, the user's visibility improves and user convenience improves.

With the program according to this embodiment, a first probability of being determined to be the selected game media through the first processing is associated with each of the plurality of game media. In the receiving step, when the second game media to be consumed for the first processing is specified, in the first processing the first probabilities of the first game media displayed in the first region are corrected in accordance with the second game media to be consumed. With this kind of configuration, the user can increase the second game media being consumed when game media the user desires or game media of high value are displayed as the first game media in the first region, and in other cases can reduce the second game media being consumed. In this manner, game strategizing is improved and the game becomes more interesting.

With the program according to this embodiment, the terminal device 20 further executes a step that displays in the second region on the screen at least one of the first game media. In the change step, the at least one first game media displayed in the second region becomes the other first game media. With this kind of configuration, the visibility of the first game media that will become objects of the subsequent iterations of the first processing is increased by causing the first game media that will be an object of the subsequent iteration of the first processing to be displayed in the second region, so game strategizing improves.

With the program according to this embodiment, the first game media displayed in the second region is determined from among a plurality of the first game media through the second processing, each time the first processing is executed. With this kind of configuration, it is possible to increase variations of the game by changing the information of a plurality of the first game media. Through this, the game becomes more interesting and the user's desire to continue the game is improved.

With the program according to this embodiment, a second probability of being determined to be the first game media displayed in the second region by the second processing is associated with each of the plurality of the first game media. In the second processing, the second probability of the first game media displayed in the first region is corrected. With this kind of configuration, it is possible to increase variations of the first game media displayed in the first region. Through this, the game becomes more interesting and the user's desire to continue the game is improved.

With the program according to this embodiment, the game is a game played by a plurality of users. When the selected game media determined by the first processing is a prescribed first game media, the terminal device 20 is caused to further execute a step that displays information indicating the manifestation of a prescribed game result to a plurality of users including the user of this terminal device, when the selected game media determined by the first processing is the prescribed first game media. With this kind of configuration, the game experience of a game in which progress is made through cooperation with other users can be provided to the user, thereby making the game more interesting.

With the program according to this embodiment, the prescribed first game media is displayed in the first region with display conditions differing from the other first game media. With this kind of configuration, the user's visibility improves and user convenience improves. Through this, the user can determine whether or not to request the first processing, knowing in advance whether or not the prescribed first game media can become the selected game media determined through the first processing, so the game becomes more interesting and the user's desire to continue the game improves.

With the program according to this embodiment, the first processing repeats the determination of whether or not the each game media included in the plurality of game media becomes the selected game media, and determines the selected game media. With this kind of configuration, in the first iteration of the first processing, a plurality of game media can be granted to the user from among the first game media displayed in the first region. Through this, the game becomes more interesting and the user's desire to continue the game improves.

The present invention was described with reference to the drawings and the embodiment, but it should be noted that one skilled in the art can easily accomplish various modifications or variations on the basis of this disclosure. Accordingly, it should be noted that such modifications and variations are included within the scope of the present invention. For example, the functions and the like included within the various means and various steps and the like can be rearranged so long as to not be logically contradictory, and a plurality of means or steps or the like can be combined into one, or can be divided.

Furthermore, in the above-described embodiment, the configuration may be such that all or a portion of the operations and processes executed by the terminal device 20 are executed by the server device 10. Similarly, the configuration may be such that a portion of the operations executed by the server device 10 is executed by the terminal device 20. For example, the process of controlling the various types of GUI and controlling display of the various screens displayed on the terminal device 20 may be executed by either the server device 10 or the terminal device 20, or may be executed by the server device 10 and the terminal device 20 working together. Or, the game system 1 need not be provided with a server device 10. In such a case, the terminal device 20 may store in advance the information received from the server device 10 in the above-described embodiment.

In addition, in the above-described embodiment, an example of the operation of the terminal device 20 was described with reference to FIG. 10. However, a portion of the steps included in that operation or a portion of the operation included in one step may be omitted. The order of a plurality of steps may be replaced within a scope that is not logically contradictory.

In addition, in the above-described embodiment, a plurality of examples was cited to describe game screens for causing progress of the game part according to this embodiment. However, a portion of the items and images and the like displayed on these game screens may be omitted. Moreover, the addition, replacement or the like of information displayed on the respective game screens may be accomplished within a scope that is not logically contradictory. For example, the game screens shown in FIG. 6 and FIG. 7 that display the first game media in the first region and receive the first processing, and the screen shown in FIG. 8 that displays the selected game media determined by the first processing, may be displayed on one screen. Through this, the user's visibility improves and user convenience improves. In addition, a link for transitioning to the user group chat screen shown in FIG. 9 may be provided on the screen displaying the selected game media determined by the first processing shown in FIG. 8. Through this, the user's convenience improves and the user's desire to continue the game improves.

In addition, in the above-described embodiment, an example was shown in which the terminal controller 25 managed the information relating to the first game media determined by the second processing with a FIFO queue structure, but this is not limiting. For example, when the first game media displayed in the first region is determined to be the selected game media by the first processing, the terminal controller 25 may change that first game media to other first game media. With such a structure, the possibility that first game media other than the game media already granted to the user by the first processing will be granted to the user increases, so the user's desire to continue to game improves.

In addition, in the above-described embodiment, an example was shown in which the probability of being determined to be the selected game media by the first processing changes in accordance with the second game media that is consumed, but this is not limiting. For example, it is also acceptable for the user to be able to specify the first game media displayed in the second region, in accordance with the second game media consumed. With this kind of structure, the user can designate, as objects of the first processing, game media the user desires, or game media with high value, so the user's desire to continue the game improves.

In addition, in the above-described embodiment, an example was shown in which group points are managed in association with user ID as information relating to the user, but this is not limiting. For example, when a user is participating in the above-described user group, the group points may be managed in association with the user group ID as information relating to the user group. With such a structure, it is possible to centrally manage the group points shared by users belonging to the user group. For example, in cases in which it is impossible to carry over the current group points when moving from the user group to which the user currently belongs to another user group, by updating only the user group ID associated with the user, the value of the group points displayed in the game screen shown in FIG. 6 is also updated to the value of the group points of the new user group. Through this, it is possible to eliminate the volume of update processing when group points increase or decrease, or when the addition or removal of users to a user group or the like occurs.

In addition, in the above-described embodiment, at least a portion of the screens displayed in the terminal device 20 may be a web display caused to be displayed on the terminal device 20 on the basis of data generated by the server device 10, and at least a portion of the screen may be a native display caused to be displayed by a native application installed on the terminal device 20. In this manner, the game according to the above-described embodiment can be made a hybrid game in which the server device 10 and the terminal device 20 are each responsible for a portion of the process. With this kind of structure, for example, when the first processing is executed by the server device 10, the terminal device 20 receives only the ID of the selected game media determined by the first processing from the server device 10, and through this can display a production on the game screen associated with that selected game media, using an image or the like stored in the device in advance. Through this, it is possible to reduce the amount of processing in the server device 10 and to reduce the volume of data communication between the server 10 and the terminal device 20.

In addition, an information processing device of a computer or mobile phone or the like can be suitably used in order to function as the server device 10 or the terminal device 20 according to the above-described embodiment. This kind of information processing device can be realized by storing in the memory unit of the information processing device a program describing process contents that realize the various functions of the server device 10 or the terminal device 20 according to this embodiment, and reading out this program and causing such to be executed by the CPU of the information processing device.

EXPLANATION OF SYMBOLS

1 Game system
10 Server device
11 Server communication unit
12 Server memory unit
13 Server controller
20 Terminal device
21 Terminal communication unit
22 Terminal memory unit
23 Display unit
24 Input unit 25 Terminal controller
30 Network

The invention claimed is:

1. A non-transitory computer-readable medium storing a program that causes a terminal device to execute:
   a step that displays one or more first game media as a first set of first game media in a first region on a screen;
   a receiving step that receives a request by a user for a first processing, wherein the request does not indicate any of the displayed first game media, and the first processing chooses selected game media from among a plurality of game media including at least the first game media displayed in the first region;
   a step that displays the selected game media chosen by the first processing; and
   a change step that changes at least a portion of the first game media out of the one or more first game media displayed in the first region to other first game media, such that the first set of first game media changes to a second set of first game media, each time the first processing is executed.

2. The non-transitory computer-readable medium according to claim 1, wherein
   in the change step, at least a portion of the first game media removed from the first set, out of the one or more first game media displayed in the first region, is hidden and the other first game media that is added to form the second set is displayed in the first region.

3. The non-transitory computer-readable medium according to claim 1, wherein
   in the terminal device, a step that displays at least one of the first game media in a second region on the screen is further executed; and
   in the change step, the at least one first game media displayed in the second region is added to form the second set of first game media.

4. The non-transitory computer-readable medium according to claim 3, wherein
   the first game media displayed in the second region is determined from among a plurality of the first game media by a second processing, each time the first processing is executed.

5. The non-transitory computer-readable medium according to claim 4, wherein
   a second probability of being determined to be the first game media displayed in the second region by the second processing is associated with each of the plurality of first game media; and
   in the second processing, the second probability of the first game media displayed in the first region is corrected.

6. The non-transitory computer-readable medium according to claim 1, wherein
   the game is a game played by a plurality of users, and
   in the terminal device, a step is further executed that, when the selected game media chosen by the first processing is prescribed first game media, information indicating a manifestation of a prescribed game result is displayed to a plurality of users including the user of the terminal device.

7. The non-transitory computer-readable medium according to claim 6, wherein
   the prescribed first game media are displayed with display aspects differing from the other first game media in the first region.

8. The non-transitory computer-readable medium according to claim 1, wherein
   the first processing is processing that chooses the selected game media by repeating a determination for each of the game media included in the plurality of game media, of whether or not to make a game media the selected game media.

9. A terminal device provided with a controller that executes a process related to a game, the controller:
   displaying one or more first game media as a first set of first game media in a first region on a screen;
   receiving a request by a user for a first processing, wherein the request does not indicate any of the displayed first game media, and the first processing chooses selected game media from among a plurality of game media including at least the first game media displayed in the first region;
   displaying the selected game media chosen by the first processing; and
   changing at least a portion of the first game media out of the one or more first game media displayed in the first region to other first game media, such that the first set of first game media changes to a second set of first game media, each time the first processing is executed.

10. A game system provided with a terminal device used by a user and a server device that provides a game to the terminal device, wherein:
    the terminal device:
       displays one or more first game media as a first set of first game media in a first region on a screen; and
       upon receiving a first processing request by the user, sends a request for the first processing to the server device wherein the first processing request does not indicate any of the displayed first game media, and the first processing chooses selected game media from among a plurality of game media including at least the first game media displayed in the first region;
    the server device, upon receiving from the terminal device the request for the first processing, executes the first processing, chooses the selected game media from among the plurality of game media including at least the first game media displayed in the first region, and sends to the terminal device an instruction to cause the selected game media to be displayed; and
    the terminal device:
       upon receiving the instruction to display the selected game media from the server device, displays the selected game media chosen by the first processing; and
       changes at least a portion of the first game media out of the one or more first game media displayed in the first region to other first game media, such that the first set of first game media changes to a second set of first game media, each time the first processing is executed.

11. A control method for a game system comprising a terminal device used by a user and a server device that provides a game to the terminal device, the control method including:
    a step that displays one or more first game media as a first set of first game media in a first region on a screen on the terminal device;
    a receiving step that receives in the terminal device a request by the user for a first processing, wherein the request does not indicate any of the displayed first game media, and the first processing chooses selected game media from among a plurality of game media including at least the first game media displayed in the first region;

a step that displays on the terminal device the selected game media chosen by the first processing; and a change step that changes at least a portion of the first game media out of the one or more first game media displayed in the first region to other first game media, such that the first set of first game media changes to a second set of first game media, each time the first processing is executed.

12. A non-transitory computer-readable medium storing a program that causes a terminal device to execute:

a step that displays one or more first game media as a first set of first game media in a first region on a screen;

a receiving step that receives a request by a user for a first processing that determines selected game media from among a plurality of game media including at least the first game media displayed in the first region;

a step that displays the selected game media determined by the first processing; and a change step that changes at least a portion of the first game media out of the one or more first game media displayed in the first region to other first game media, such that the first set of first game media changes to a second set of first game media, each time the first processing is executed, wherein in the change step, at least a portion of the first game media removed from the first set, out of the one or more first game media displayed in the first region, is hidden and the other first game media that is added to form the second set is displayed in the first region, in the first region, the one or more first game media in the first set are displayed lined up in a row, and the at least a portion of the game media added to form the second set is positioned at one end of the row; and in the change step, the one or more first game media displayed in the first region are slid to the side of the one end along the row, the at least a portion of the first game media that is removed from the first set is hidden, and the other first game media that is added to form the second set is displayed at the other end of the row.

13. A non-transitory computer-readable medium storing a program that causes a terminal device to execute:

a step that displays one or more first game media as a first set of first game media in a first region on a screen;

a receiving step that receives a request by a user for a first processing that determines selected game media from among a plurality of game media including at least the first game media displayed in the first region;

a step that displays the selected game media determined by the first processing; and a change step that changes at least a portion of the first game media out of the one or more first game media displayed in the first region to other first game media, such that the first set of first game media changes to a second set of first game media, each time the first processing is executed, wherein a first probability of being determined to be the selected game media by the first processing is associated with each of the plurality of game media; and in the receiving step, when second game media to be consumed for the first processing are specified, in the first processing, the first probability of the first game media displayed in the first region is corrected in accordance with the second game media that is consumed.

* * * * *